United States Patent [19]

Diamond

[11] Patent Number: 5,785,353
[45] Date of Patent: Jul. 28, 1998

[54] NEGOTIABLE DOCUMENT HAVING ENHANCED SECURITY FOR DETERRING GENERATION OF COPIES OF THE NEGOTIABLE DOCUMENT

[75] Inventor: Robert L. Diamond, Alpine, Utah

[73] Assignee: Diamond Security, Inc., Alpine, Utah

[21] Appl. No.: 731,055

[22] Filed: Oct. 9, 1996

Related U.S. Application Data

[63] Continuation-in-part of Ser. No. 333,542, Nov. 2, 1994, Pat. No. 5,575,508, which is a continuation-in-part of Ser. No. 241,798, May 12, 1994, Pat. No. 5,538,290, which is a continuation-in-part of Ser. No. 57,614, May 5, 1993, abandoned.

[51] Int. Cl.$^6$ ............................................. B42D 15/00
[52] U.S. Cl. ........................... 283/67; 283/72; 283/58; 283/113
[58] Field of Search ........................... 283/57, 58, 113, 283/114, 72; 428/357, 199, 211

[56] References Cited

U.S. PATENT DOCUMENTS

| | | |
|---|---|---|
| 1,383,792 | 7/1921 | Dickinson . |
| 4,210,346 | 7/1980 | Mowry, Jr. et al. . |
| 4,227,719 | 10/1980 | McElligott et al. . |
| 4,227,720 | 10/1980 | Mowry, Jr. et al. . |
| 4,265,469 | 5/1981 | Mowry, Jr. et al. . |
| 4,310,180 | 1/1982 | Mowry, Jr. et al. . |
| 4,341,404 | 7/1982 | Mowry, Jr. et al. . |
| 4,351,547 | 9/1982 | Brooks, II . |
| 5,085,936 | 2/1992 | Herdman . |
| 5,149,140 | 9/1992 | Mowry, Jr. et al. . |
| 5,189,292 | 2/1993 | Batterman . |
| 5,375,886 | 12/1994 | Tsuchiya . |
| 5,487,567 | 1/1996 | Volpe . |
| 5,538,290 | 7/1996 | Diamond ............................ 283/113 |
| 5,575,508 | 11/1996 | Diamond ............................ 283/58 |

*Primary Examiner*—Willmon Fridie, Jr.
*Attorney, Agent, or Firm*—Russell N. Rippamonti

[57] ABSTRACT

A negotiable document includes enhanced security for deterring the fraudulent photocopying of the subject negotiable document. A first pantographic design is imprinted as the general background of the front face of a check and a second pantographic background design is imprinted in the amount line and in the signature line. The enhanced security document of the present invention further includes a muted warning phrase of a first dot size incorporated in the first pantographic design and a muted warning phrase of a second dot size incorporated in the second pantographic background design. Alternatively, it will be understood that a similar warning phrase may be generated with a different first and second size dot density or line density instead of a first dot size and a second dot size. By using a plurality of line densities, or dot densities, or dot sizes for the warning phrases, an unauthorized individual will be unable to adjust a photocopier to mask a single warning phrase.

23 Claims, 4 Drawing Sheets

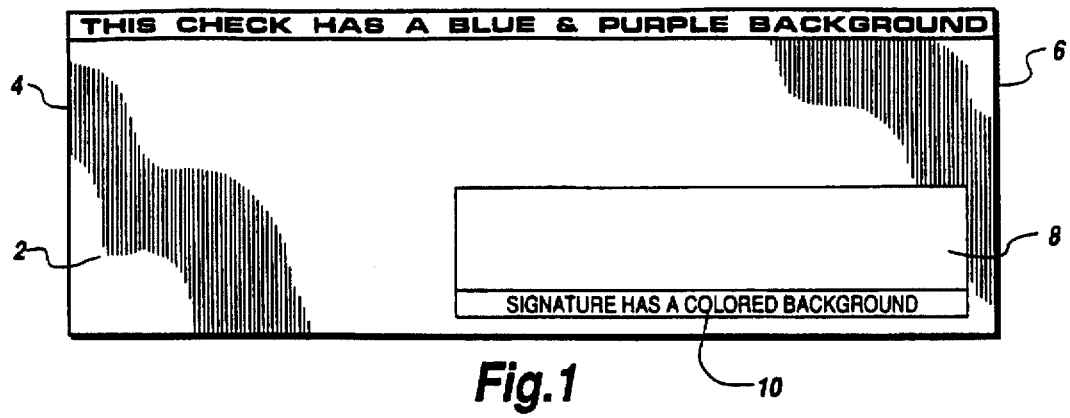
Fig.1
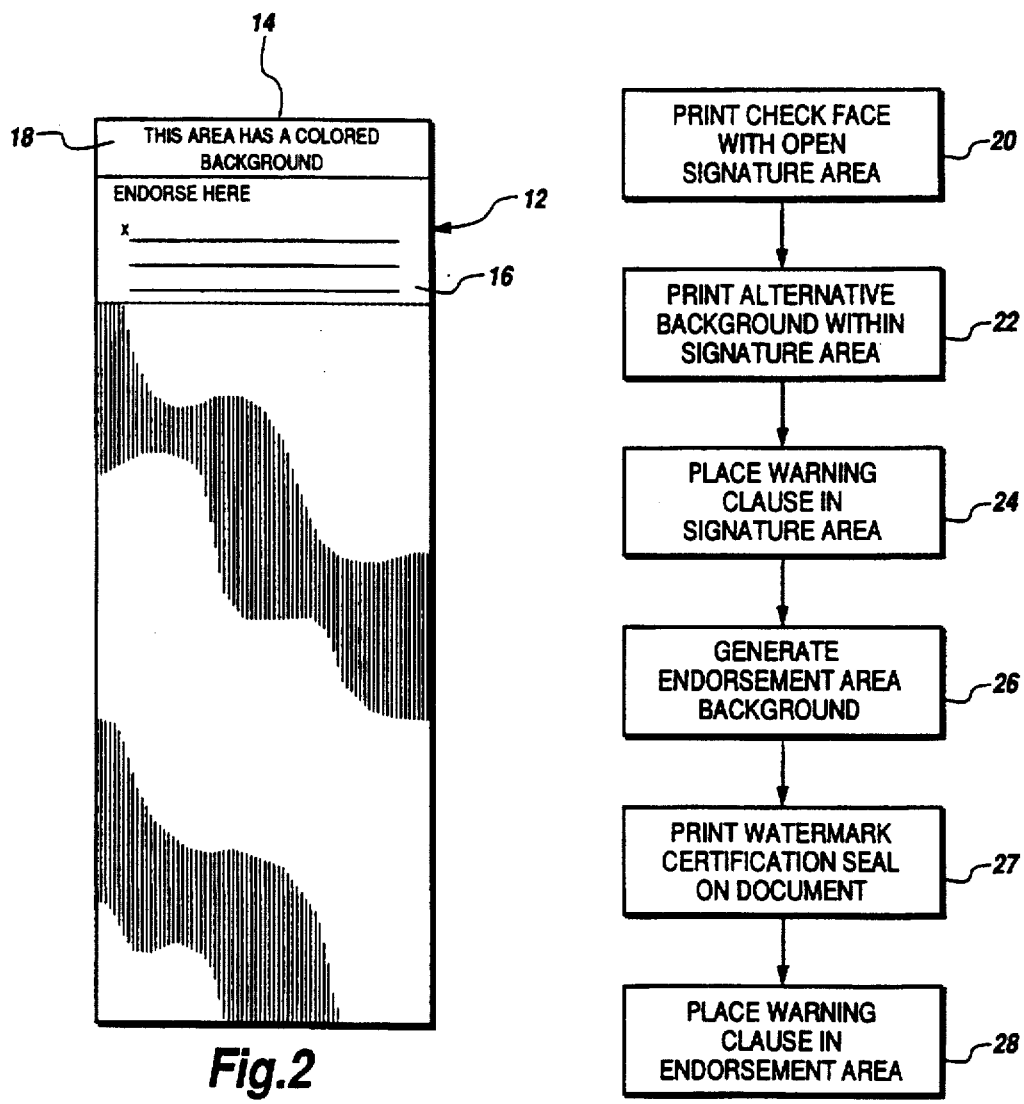
Fig.2
Fig.3

NEGOTIABLE DOCUMENT HAVING ENHANCED SECURITY FOR DETERRING GENERATION OF COPIES OF THE NEGOTIABLE DOCUMENT

RELATED APPLICATION

This application, entitled A NEGOTIABLE DOCUMENT HAVING ENHANCED SECURITY FOR DETERRING GENERATION OF COPIES OF THE NEGOTIABLE DOCUMENT, is a continuation in part of Ser. No. 08/333,542, filed Nov. 2, 1994, now U.S. Pat. No. 5,575,508, allowed but not issued, which is a continuation-in-part of U.S. Ser. No. 08/241,798 filed May 12, 1994, now U.S. Pat. No. 5,538,290, issued Jul. 23, 1996, which is a continuation-in-part of U.S. application Ser. No. 08/057,614, filed May 5, 1993, now abandoned, all previous applications being entitled METHOD AND APPARATUS FOR INHIBITING THE COPYING OF CHECKS AND NEGOTIABLE DOCUMENTS.

TECHNICAL FIELD

This invention relates to negotiable documents, and more particularly to a negotiable document having enhanced security for deterring the fraudulent photocopying of the subject negotiable document.

BACKGROUND OF THE INVENTION

A major problem within the check cashing industry is the increasing risks arising from the copying of checks by unauthorized individuals. These risks have increased due to the improved technology in the areas of copiers, computer aided design and desk top publishing. Advancements in these areas have created the ability to duplicate checks and other negotiable documents to such a high degree of accuracy that an individual receiving the check or negotiable document has difficulty in determining if the document is fraudulent.

A variety of methods have been implemented to protect against the unauthorized copying of checks and negotiable documents. These preventative methods have included the use of multi-colored check faces and specially designed check backgrounds that are not easily copied. Some manufacturers have utilized the placement of the word "void" in a muted design that normally blends in with the background of a check but becomes visible when the check is processed through a single or full color copier. Other manufacturers use a rainbow color scheme with graduated colors from blue to green or blue to purple across the face of a check or negotiable document. The rainbow color scheme makes the check more difficult to photocopy.

Another technique utilized to protect against fraudulent checks and negotiable documents is the placement of artificial watermark certification seals upon the check or negotiable document. The seals are only apparent to an individual when viewing a check or negotiable document from an angle. The watermark certification seals cannot be copied and a warning placed upon the check or negotiable document alerts an individual to the required presence of the watermark.

However, none of these security methods protect two particularly vital areas of a check or negotiable document. The most critical areas of a check or negotiable document are the signature area and the endorsement area on the back of the check. None of the methods to date have focused upon protection of these particularly vital areas. Another problem arises from the fact that the watermark certification seals placed upon the check or negotiable document are difficult to see, making it difficult for an individual cashing the check to easily determine whether the proper watermark seal is present. Thus, a need has arisen for a method and apparatus specifically protecting the vital signature and endorsement areas of a check or negotiable document and allowing an individual to more easily determine the presence of a watermark certification seal.

Another method utilized to deter duplication of checks or negotiable documents uses a pantograph design, having a different screen density and/or different lines per inch within the screen. This causes a difference in the size of the dots making up the design, but the differences are muted to the naked eye. Warning phrases and words, such as VOID, COPY, etc., are designed within the larger or smaller dots.

If a check or negotiable document using this feature is processed through a copier or other scanning device, the larger dots are copied, but the smaller dots are not copied. Thus, the phrase encoded within the differing size dots will appear in the copy. The degree of success of this procedure depends upon the pantograph design, the ink color, the screen density and the lines per square inch of the screen. However, current technological advances in copying devices allow various settings to be used upon the copying device. Thus, by iterative procedures, an unauthorized individual could adjust the settings of a sophisticated copying device to copy a check or negotiable document in such a manner that the encoded warning clause would not appear.

SUMMARY OF THE INVENTION

The foregoing and other problems are overcome by the present invention. The negotiable document of the present invention includes enhanced security for deterring the fraudulent photocopying of the subject negotiable document. A first pantographic design is imprinted as the general background of the front face of a check and a second pantographic background design is imprinted in the amount line and in the signature line on the front face. The present invention further includes a warning phrase of a first dot size incorporated in the first pantographic design and a warning phrase of a second dot size incorporated in the second pantographic background design. Alternatively, it will be understood that a similar warning phrase may be generated with a different first and second size dot density or line density instead of a first dot size and a second dot size. By using a plurality of line densities, or dot densities, or dot sizes for the warning phrases, an unauthorized individual will be unable to adjust a photocopier to mask a single warning phrase.

BRIEF DESCRIPTION OF THE DRAWINGS

For a more complete understanding of the present invention and the advantages thereof, reference is now made to the following description taken in conjunction with the accompanying drawings in which;

FIG. 1 illustrates the front side of a check utilizing the signature area of the present invention;

FIG. 2 is an illustration of the back of a check utilizing the endorsement area of the present invention;

FIG. 3 is a flow diagram describing the process of the present invention;

DETAILED DESCRIPTION

Figure 4:
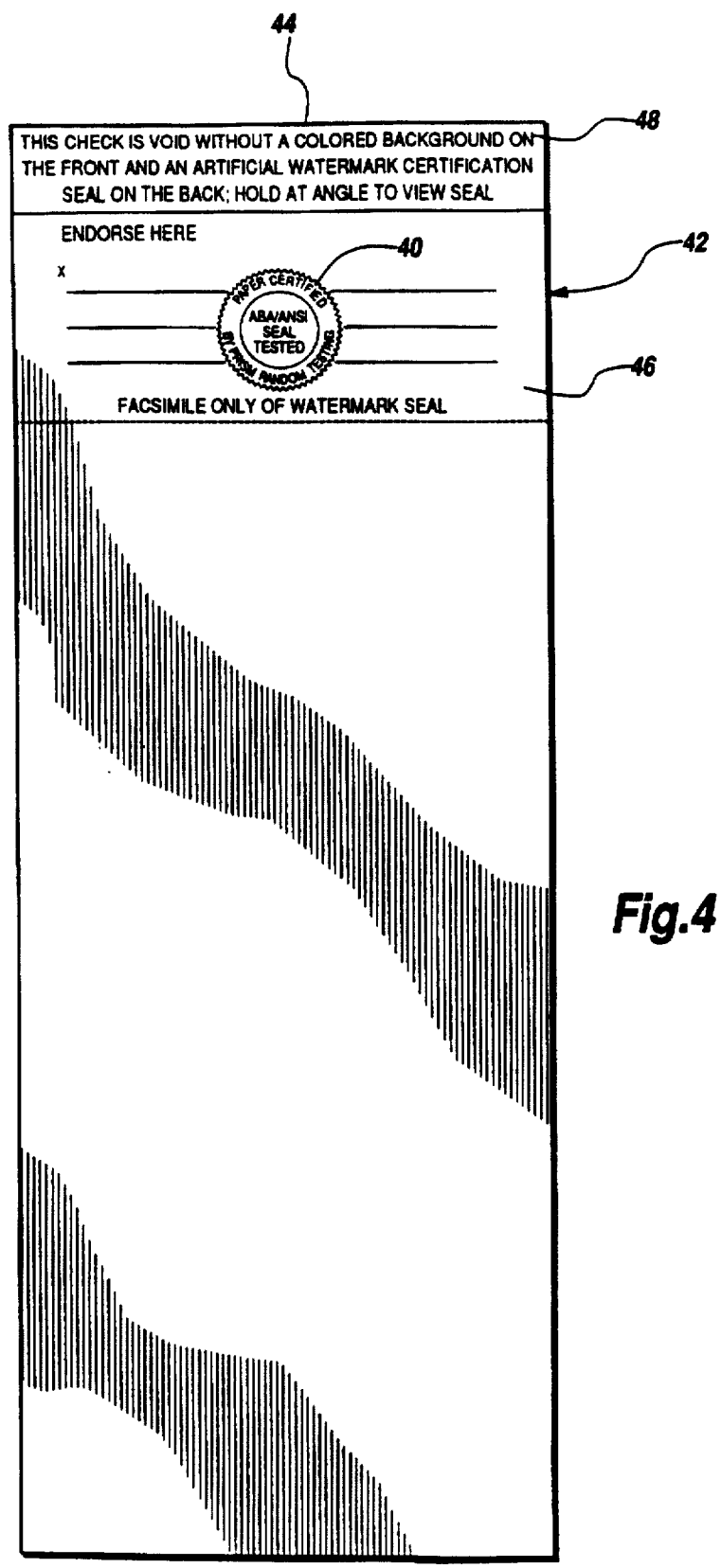
FIG. 4 is an illustration of an alternative embodiment of the back of a check having an endorsement area containing a representation of the watermark certification seals incorporated onto the check.

Referring now to the Drawings, and more particularly to FIG. 1, there is illustrated the front side of a check utilizing the signature area of the present invention. The check comprises a substantially rectangular sheet of paper having a check face 2, covered with a pantographic background design. As the pantographic background design proceeds from the left side 4 of the check to the right side 6 of the check, the color graduates from one color to other colors, for example, from blue to green or blue to purple. The signature area 8 of the check, comprises an area having a pantographic background design different from the design encompassing the majority of the face 2 of the check. Furthermore, as you proceed from the left side of the signature area to the right side of the signature area, a graduated color change can occur.

A warning clause 10 is placed in the signature area 8 indicating that the signature area has a colored background. The warning clause may also include an indication of the differing background within the signature area 8, refer to the presence of a watermark certification seal located somewhere on the check or describe any other relevant feature of the signature area. The warning clause 10 uses a background and print that is clearly visible prior to and after any unauthorized copying. In the preferred embodiment, this would be achieved by using a solid color background, as opposed to a pantographic background design, with the warning clause 10.

Referring now to FIG. 2, there is shown the back of a check having an endorsement area printed or manufactured in accordance with the present invention. The endorsement area 12 comprises an area located at the top edge 14 of the check. The face 16 of the endorsement area 12 is covered by a pantographic background design similar to the pantographic background design on the face 2 of the check. The pantographic background design may be a single color or alternatively, may have multi-colors fading from one color to the other colors across the face 16 of the endorsement area 12.

A warning clause 18 across the top of the endorsement area 12 describes the color and/or background of the endorsement area. The warning clause 18 may further describe any relevant aspect of the endorsement area 12 and the face of check 2. The warning clause 18 is printed using a background and print that is clearly visible prior to and after any unauthorized copying. In the preferred embodiment, this would be achieved by using a solid color background, as opposed to a pantographic background design, with the warning clause 18. While the description with respect to FIGS. 1 and 2 were made with respect to a check, it is to be understood that the invention is applicable to any negotiable document.

Referring now to FIG. 3, there is shown a block diagram illustrating the process of the present invention. The check face is printed at step 20. At step 22, the signature area is also printed with an alternative background and a color scheme similar to that of the remainder of the face of the check. At step 24, the warning clause is placed in the signature area of the check to describe the background and/or color of the signature area. The endorsement area background is generated at step 26 within the endorsement area to have a pantographic background design similar to the design on the front of the check. The watermark certification seal representation is printed on the check at step 27 to provide an individual with a quick reference as to the appearance of the watermark certification seals printed on the check. The representation will normally be placed within the endorsement area but this is not required. A warning clause is placed at step 28 in the endorsement area of the check to describe the background and/or color of the endorsement area.

Referring now to FIG. 4, there is shown an alternative embodiment of the present invention wherein a watermark certification seal representation 40 is incorporated into the background of the check endorsement area 42. As before, the endorsement area 42 comprises an area located at the top edge 44 of the check. The face 46 of the endorsement area 42 is covered by a pantographic background design similar to the pantographic background design on the front face 2 (FIG. 1) of the check. At some location within the endorsement area 42, the watermark certification seal representation 40 is included. The watermark certification seal representation 40 is a replica of the artificial watermark certification seals (not shown) placed upon other locations of the check or negotiable document. A notification 41 placed at the bottom of the endorsement area 42 notifies a user that the watermark certification seal representation 40 is only a facsimile of the actual watermark certification seal (not shown). By placing the watermark certification seal representation 40 within the endorsement area 42, an individual can quickly determine what they are looking for when trying to ascertain the existence of an artificial watermark certification seal in other locations on the check. As in FIG. 2 a warning clause 48 notifies users of various security features used on the check.

Figure 5:
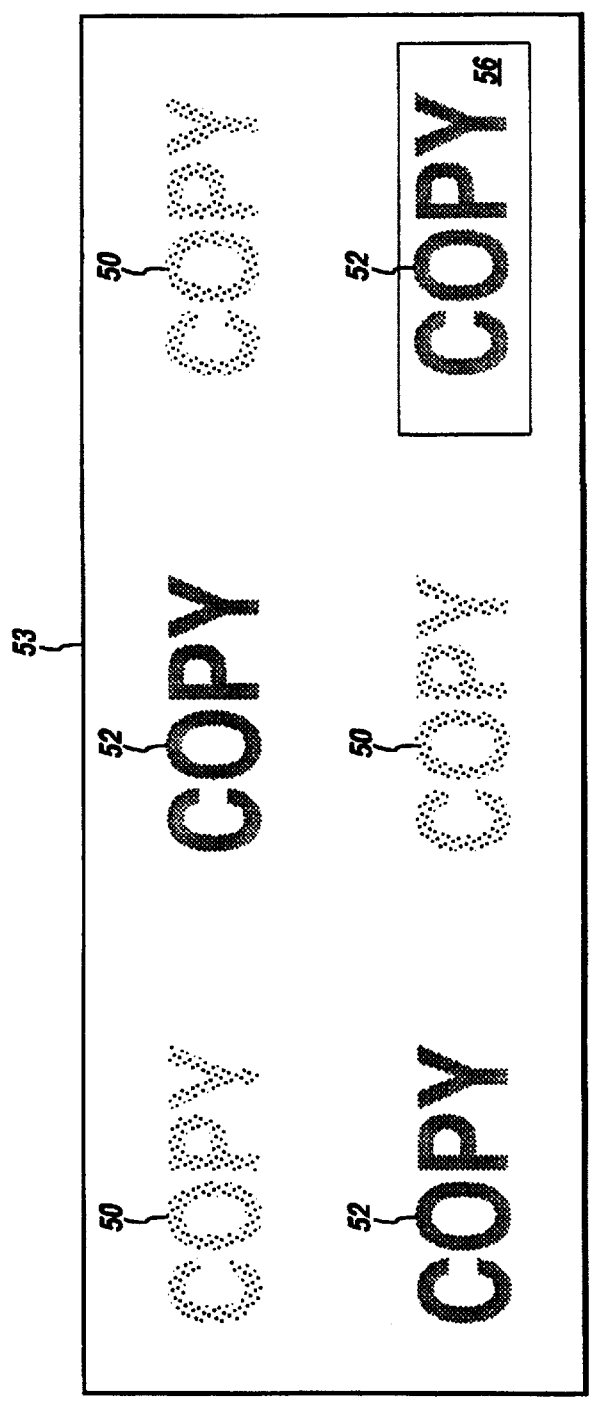
FIG. 5 is an illustration of a check having warning phrases of differing dot pattern sizes encoded in the background of the check.

Yet another method for protecting checks and negotiable documents is illustrated in FIG. 5, wherein muted warning phrases, such as VOID or COPY, are included within the background area of the check. Presently existing protection methods utilize known methods to create a warning phrase or group of warning phrases having a uniform number of line or dots per square inch. While this method protects a check or negotiable document from being copied on a majority of existing copying systems, many presently existing, more sophisticated copying systems may be set to a particular copying level such that the warning clauses would remain muted in a copied document.

Thus, the present invention utilizes a check or negotiable document incorporating warning phrases having two or more different types of line or dot densities upon the face of the check or negotiable document. A first group of warning phrases 50 uses a pattern of dots of a first size. Along with this first group of warning phrases is a second group of warning phrases 52 created from a different screen density and/or different lines per inch on the screen and having a pattern of dots of a second size. Surrounding the first and second groups of warning phrases (50, 52) is a background pattern 53 of dots having a third size. Generation of the warning clauses and background are accomplished using methods known in the art.

The differing warning phrases (50, 52) may be placed on different portions of the check or negotiable document. For example, the first group of warning phrases may be placed on the background of the majority of the document while the second group of warning phrases are placed in the background of the signature area 56. The differing groups of warning phrases (50, 52) may also be used within the same area of the check or negotiable document. By using a plurality of line or dot densities for the warning phrases (50, 52), an unauthorized individual will be unable to adjust a copier to mask a single warning phrase (50, 52) since the other warning phrase will still appear. Thus, the warning phrases will appear when copied on a greater number of copiers and copier settings than is possible using only a single line or dot density pattern.

Figure 6:
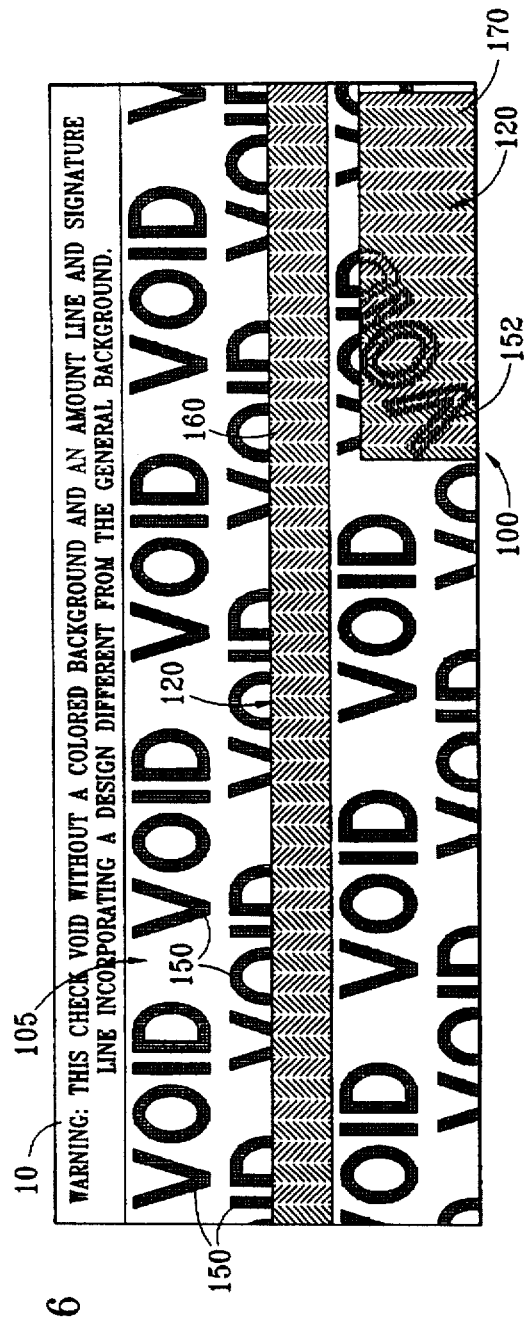
FIG. 6 illustrates the appearance of a typical photocopy of a check having a pantographic background located in the amount line and signature line different from the general background of the check and incorporating warning phrases of a first and second dot sizes.
Figure 7:
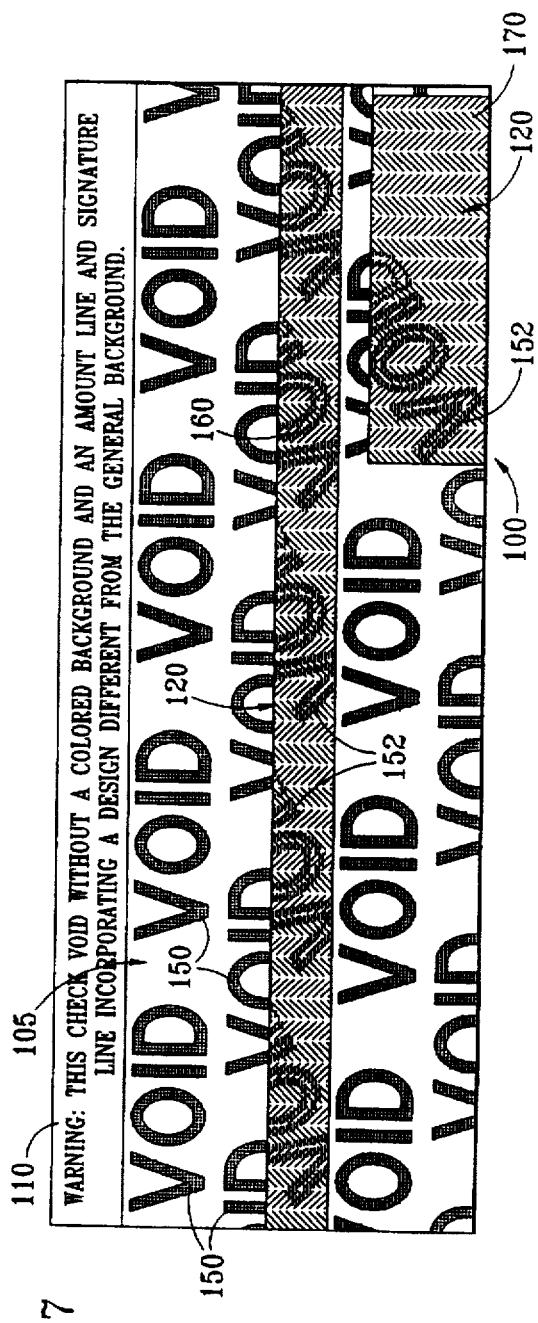
FIG. 7 illustrates the appearance of a photocopy of the check of FIG. 6 made on different light setting of the same photocopy machine.

FIGS. 6 and 7 illustrate the appearance of typical photocopies of the front face of an alternate embodiment of the present invention. The alternate embodiment 100 includes a first pantographic design 105 positioned as the general background of the front face of a check 100 and a second pantographic background 120 positioned in the amount line 160 and in the signature line 170 on the front face of the check. The second pantographic design 120 is different from the first pantographic design 105. The alternate embodiment 100 further includes a muted warning phrase of a first dot size 150 incorporated in the first pantographic design 105 and a warning phrase of a second dot size 152 incorporated in the second pantographic background 120. The alternate embodiment 100 may also include a textual warning notification 110 printed on either the front face or rear face of check 100.

Alternatively, it will be understood that a similar muted warning phrase may be generated with a different first and second dot density or line density instead of a first dot size 150 and a second dot size 152. By using a plurality of line densities, dot densities, or dot sizes for the warning phrases 150 and 152, an unauthorized individual will be unable to adjust a copier to mask a single warning phrase 150 or 152 since the other warning phrase will still appear. FIGS. 6 and 7 illustrate the difference in typical photocopies of the check 100 made on different light settings of the same photocopier. Thus, the warning phrases will appear when copied on a greater number of copiers and copier settings than is possible using only a single dot size, single line density or single dot density pattern.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A negotiable document having enhanced security for deterring generation of copies of the negotiable document, comprising:
    a front side;
    a back side;
    a first predesignated area on the front side for insertion of the payable amount of the negotiable document;
    a second predesignated area on the front side for a signature;
    a third predesignated border area;
    a first pantographic background substantially covering the first and second predesignated areas; and
    a second pantographic background differing from the first pantographic background, said second pantographic background substantially covering the remaining portion of the front side of the document not in the first, second and third predesignated areas.

2. The negotiable document of claim 1 further including:
    a first warning mark comprised of a first dot size pattern in the first pantographic background; and
    a second warning mark comprised of a second dot size pattern in the second pantographic background.

3. The negotiable document of claim 2 further including a warning clause describing the first pantographic background.

4. The negotiable document of claim 3, wherein the warning clause describes the color of the first pantographic background.

5. The negotiable document of claim 1, wherein the first pantographic background is multicolored.

6. The negotiable document of claim 2 further including a warning clause describing the second pantographic background.

7. The negotiable document of claim 6, wherein the warning clause describes the color of the second pantographic background.

8. The negotiable document of claim 1, wherein the second pantographic background is multicolored.

9. The negotiable document of claim 2, further including a warning clause describing the second pantographic background.

10. The negotiable document of claim 1 further including:
    a first warning mark comprised of a first dot density pattern in the first pantographic background; and
    a second warning mark comprised of a second dot density pattern in the second pantographic background.

11. The negotiable document of claim 10 further including a warning clause describing the first pantographic background.

12. The negotiable document of claim 11, wherein the warning clause describes the color of the first pantographic background.

13. The negotiable document of claim 10 further including a warning clause describing the second pantographic background.

14. The negotiable document of claim 13, wherein the warning clause describes the color of the second pantographic background.

15. The negotiable document of claim 1 further including:
    a first warning mark comprised of a first line density pattern in the first pantographic background; and
    a second warning mark comprised of a second line density pattern in the second pantographic background.

16. The negotiable document of claim 15 further including a warning clause describing the first pantographic background.

17. The negotiable document of claim 15, wherein the warning clause describes the color of the first pantographic background.

18. The negotiable document of claim 15 further including a warning clause describing the second pantographic background.

19. The negotiable document of claim 15, wherein the warning clause describes the color of the second pantographic background.

20. A method for enhancing security of a negotiable document and deterring copying of the negotiable document, comprising the steps of:
    generating a first warning mark for printing on a first side of a negotiable document, said first warning mark comprised of a first dot size pattern reproducible by various copier systems;

generating a second warning mark for printing on a first side of the negotiable document, said second warning mark comprised of a second dot size pattern reproducible by various copier systems;

generating a first pantographic background pattern around the first warning mark, said first background pattern comprised of a pattern reproducible by various copy systems; and generating a second pantographic background pattern around the second warning mark, said first background pattern comprised of a pattern reproducible by various copy systems.

21. The method of claim 20 further including the steps of:

printing the first pantographic background within a predetermined signature area and an area predetermined for a payable amount of the negotiable document; and printing a second pantographic background substantially covering the remaining portion of the first side of the negotiable document not covered by the first pantographic background.

22. The method of claim 21 further including:

generating a warning clause describing the first pantographic background; and printing said warning clause on the negotiable document.

23. The method of claim 21 further including:

generating a warning clause describing the second pantographic background; and printing said warning on the negotiable document.

* * * * *